(12) United States Patent
Hoover et al.

(10) Patent No.: US 12,686,497 B2
(45) Date of Patent: Jul. 21, 2026

(54) AIRCRAFT SEAT WITH MULTIDIRECTIONALLY ADJUSTABLE WING ARMOR

(71) Applicant: AMI Industries, Inc., Colorado Springs, CO (US)

(72) Inventors: Douglas E. Hoover, Colorado Springs, CO (US); Chad R. Pacheco, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 171 days.

(21) Appl. No.: 18/430,335

(22) Filed: Feb. 1, 2024

(65) Prior Publication Data

US 2025/0250012 A1 Aug. 7, 2025

(51) Int. Cl.
| | |
|---|---|
| *B64D 11/06* | (2006.01) |
| *B64D 7/00* | (2006.01) |
| *F41H 7/00* | (2006.01) |

(52) U.S. Cl.
CPC ............ B64D 11/0689 (2013.01); B64D 7/00 (2013.01); F41H 7/00 (2013.01)

(58) Field of Classification Search
CPC . B60R 21/02; B60R 21/026; B60R 2021/022; B60R 2021/0266; B60N 2/42; B60N 2/4249; B60N 2/2884; B60N 2002/0212; B60N 2002/0216; B64D 7/00
See application file for complete search history.

(56) References Cited

U.S. PATENT DOCUMENTS

| | | | | |
|---|---|---|---|---|
| 1,689,132 A | * | 10/1928 | Haarnagell | ........... E05F 11/382 |
| | | | | 49/450 |
| 3,420,475 A | | 1/1969 | Castillo et al. | |
| 3,581,620 A | | 6/1971 | Hauck et al. | |
| 3,922,030 A | * | 11/1975 | Stedman | .............. B60N 2/4249 |
| | | | | 296/68.1 |

(Continued)

FOREIGN PATENT DOCUMENTS

| | | |
|---|---|---|
| CA | 2702266 C | 1/2015 |
| CN | 116424557 A | 7/2023 |

(Continued)

OTHER PUBLICATIONS

Translation of DE 4446595 A1 (Year: 1995).*

(Continued)

*Primary Examiner* — Joshua J Michener
*Assistant Examiner* — Ryan Andrew Yankey
(74) *Attorney, Agent, or Firm* — Suiter Swantz IP

(57) ABSTRACT

An armored seating assembly for a rotorcraft or other aircraft (e.g., for a pilot or operator) includes a wing armor panel capable of rotational and vertical movement relative to the seat base when adjusted by the operator. For example, a carriage attached to the armor panel translates along a carriage slot in the seat base, stabilized in the carriage slot by orthogonal sets of bearings (e.g., lateral bearings and longitudinal bearings) and allowing the wing armor panel to be vertically adjusted relative to the seat base (e.g., to accommodate pilots of varying heights). The armor panel is coupled to the carriage by hinges allowing the panel to pivot or rotate away from the seat base, in order to facilitate entry to and egress from the seat.

7 Claims, 7 Drawing Sheets

(56)          References Cited

U.S. PATENT DOCUMENTS

| | | | | |
|---|---|---|---|---|
| 3,922,034 | A * | 11/1975 | Eggert | F41H 5/08 |
| | | | | 297/216.12 |
| 4,177,163 | A | 12/1979 | Oleck et al. | |
| 6,073,884 | A * | 6/2000 | Lavergne | F41H 7/046 |
| | | | | 89/36.11 |
| 6,164,181 | A | 12/2000 | Bruner | |
| 9,132,753 | B1 | 9/2015 | Campbell | |
| 11,473,878 | B2 * | 10/2022 | Labock | F41H 7/044 |
| 11,524,786 | B2 * | 12/2022 | Hoover | B64D 11/0644 |
| 11,794,904 | B2 * | 10/2023 | Pacheco | B60N 2/42709 |
| 2014/0316661 | A1 * | 10/2014 | Parker | B60N 2/39 |
| | | | | 701/49 |

FOREIGN PATENT DOCUMENTS

| | | | | | |
|---|---|---|---|---|---|
| DE | 1009977 | B | 6/1957 | | |
| DE | 4446595 | A1 * | 10/1995 | | B60N 2/28 |
| DE | 202013000850 | U1 * | 3/2013 | | B60R 21/12 |
| EP | 0430773 | B1 | 5/1994 | | |
| JP | S63311095 | A | 12/1988 | | |
| WO | 2015167949 | A1 | 11/2015 | | |

OTHER PUBLICATIONS

Translation of DE 202013000850 U1 (Year: 2013).*
European Patent Office, Extended European Search Report received
in EP Application No. 25155649.4, Mar. 24, 2025, 6 pages.

* cited by examiner

AIRCRAFT SEAT WITH MULTIDIRECTIONALLY ADJUSTABLE WING ARMOR

BACKGROUND

Military helicopters and rotorcraft may protect their pilots and operators via wing armor, (e.g., hip armor) or peripheral armor attached to the pilot seat on the outboard side. In order for wing armor to provide coverage for pilots of various sizes, the wing armor panel must be movable or positionable relative to the pilot seat. Conventional approaches attach the wing armor to the seat via a four-bar linkage. However, this approach provides a relatively weak attachment to the seat structure and may not support the heavy armor plate as well in some positions (e.g., fully forward). Further, the four-bar linkage may provide limited range of motion relative to the pilot seat and may be prone to vibration when installed in a helicopter cockpit. Finally, the multiple pivot points required by the four-bar linkage increases the likelihood of long-term reliability issues.

SUMMARY

In an aspect, an armored seating assembly for a rotorcraft or aircraft (e.g., for a pilot or operator) is disclosed. In embodiments, the seating assembly includes a seat base mountable to the aircraft floor and extending above said floor, a carriage slot set into the seat base on the outboard side. A carriage translates along the carriage slot via two orthogonal sets of bearings or rollers (e.g., lateral and longitudinal) preventing play or vibration as the carriage translates. An armor bracket is pivotably attached to the carriage and a wing armor plate fixed to the armor bracket. The pilot or operator occupying the seat may adjust the armor plate up or down in a substantially vertical direction (to accommodate pilots of varying heights) according to the translation of the carriage along the carriage slot. Further, the pilot or operator may rotate or pivot the armor plate away from or toward the seat, e.g., to facilitate entry to and egress from the seat.

In some embodiments, the armor bracket is attached to the carriage via a set of frictional hinges allowing the armor panel to remain at the rotational orientation to which the pilot or operator has set the panel.

In some embodiments, the seating assembly includes a dampening system connecting the seat base and carriage. For example, the dampening system has a default setting holding the armor panel to an uppermost vertical position so as to provide resistance (e.g., against the weight of the armor panel) slowing downward tracking of the armor panel and assistance with upward tracking of the armor panel (e.g., when raised by the pilot).

In some embodiments, the dampening system includes a dampener spring.

In some embodiments, the dampening system includes a gas piston or like linear actuator.

In some embodiments, the seating assembly includes a locking mechanism for locking the armor panel at a vertical position (e.g., to which it has been raised or lowered by the pilot).

In some embodiments, the carriage includes a vertical array of metering holes, each metering hole corresponding to a discrete vertical position of the armor panel. The locking mechanism includes a locking pin secured in a metering hole of the array, the locking pin connected by a cable to a trigger or lever set into a handle attached to the inboard side of the armor panel. For example, by grasping the handle and engaging the lever, the pilot may release the locking pin from its metering hole, allowing the pilot to raise or lower the armor panel to a new discrete vertical position (e.g., corresponding to a higher or lower metering hole). The pilot may then secure the armor panel at the new vertical position by releasing the lever and locking the pin into the corresponding metering hole.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
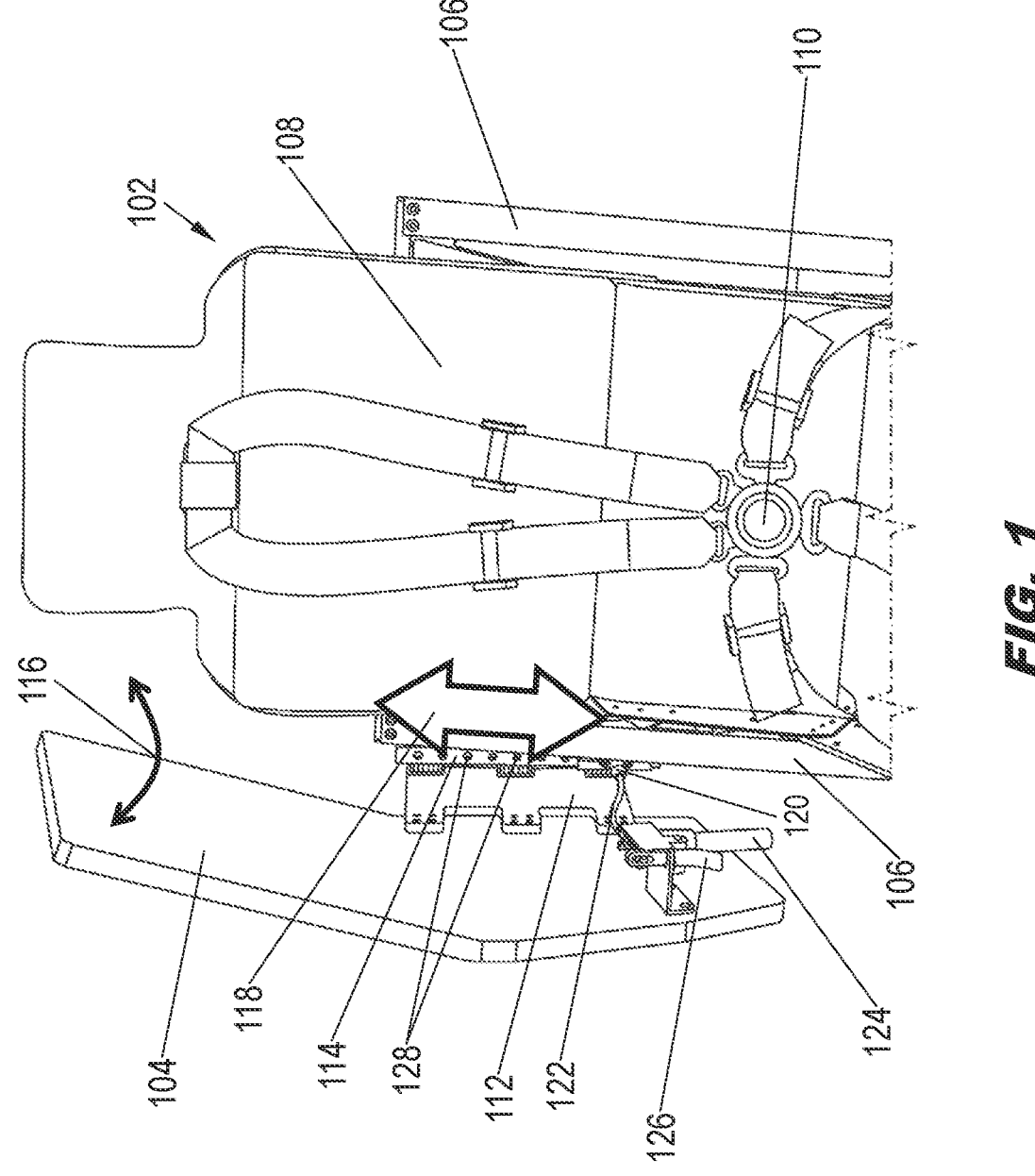
FIG. 1 is a forward isometric view of an armored seating assembly according to with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a wing armor assembly for a pilot or operator seat of a helicopter or rotorcraft. For example, the wing armor may be mounted to the pilot seat via a tracking carriage system that provides for low-friction dampener-aided vertical movement and protects the wing armor from inflight vibration. The wing armor may be further mounted to the seat base via frictional hinges, allowing rotation of the wing armor in the inboard-outboard direction to facilitate entry and egress by the pilot. The wing armor may be lockable into a range of vertical positions to accommodate pilots of different sizes, but easily repositionable when needed.

Referring in particular to FIG. 1, the cockpit or control area of an aircraft 100 is shown. For example, the aircraft 100 may be a helicopter or other rotorcraft. The aircraft 100 may include a pilot seat 102 for accommodating a pilot or operator of the aircraft, the pilot seat protected on its outboard side by wing armor 104. The pilot seat 102 may include a seat base 106 mounted to the cockpit floor as well as a seatback 108 and security harness 110 capable of accommodating the pilot.

In embodiments, the wing armor 104 may comprise an armor panel attached to the seat base 106 (e.g., on its outboard side) by an armor bracket 112 fixed to the interior of the wing armor. For example, the armor bracket 112 may be pivotably attached to a carriage 114 as described below, allowing the wing armor 104 and armor bracket to pivot (116) in the inboard/outboard direction (e.g., substantially relative to a vertical axis or z-axis). In embodiments, the carriage 114 may be attached to the seat base 106 via tracking bearings or rollers as described below, allowing the carriage, armor bracket 112, and wing armor 104 to translate substantially vertically (118) up or down relative to the seat base.

In embodiments, the wing armor 104 may include a locking assembly allowing the wing armor to be secured to one of a set of discrete vertical positions relative to the seat base 106. For example, the locking assembly may comprise a locking pin 120 (see also FIGS. 3A through 3C, below) connected by a cable 122 to a control handle 124 and lever 126 mounted to the wing armor 104, e.g., to an interior or inboard face thereof.

In embodiments, the locking pin 120 may be locked into one of a series of metering holes 128 set into the carriage 114 in a substantially vertical array. For example, each metering hole 128 may correspond to a discrete vertical position of the wing armor 104 relative to the seat base 106 (and to the pilot seat 102 generally). In embodiments, the pilot may reposition the wing armor in a new discrete vertical position by grasping the control handle 124 and engaging the lever 126 to release the locking pin 120 from its metering hole 128. Further, the pilot may reposition the wing armor 104 at the new discrete vertical position by raising or lowering (118) the wing armor (via the control handle 124) such that the locking pin 120 aligns with a new metering hole 128 and releasing the lever 126 to secure the locking pin in the desired metering hole (and the wing armor at the corresponding discrete vertical position).

Referring also to FIGS. 2A through 2D, the pilot seat 102 is shown with the wing armor 104 respectively in a full-up and a full-down vertical position relative to the seat base 106.

In embodiments, the wing armor 104 may attach to the seat base 106 via the armor bracket 112 and carriage 114, the armor bracket fixed to the wing armor 104 and the carriage set into a carriage slot 200 of the seat base 106 by bearings or rollers capable of translating along the carriage slot. For example, the carriage slot 200 may extend along an upper portion 204 of the outboard side of the seat base 106. Further, the wing armor 104 may include a lower edge 206 substantially parallel to the aircraft floor 208 and a trailing edge 210 extending at an angle 212 to the floor, such that the carriage slot 200 extends along the seat base 106 at a substantially parallel angle to the trailing edge.

In embodiments, referring also to FIGS. 2C through 2F, the carriage 114 may be set into the carriage slot 200 via a combination of lateral bearings 214 and longitudinal bearings 216. For example, the carriage 114 may be guided in its translation along the carriage slot 200 by the rotation of the lateral bearings 214 within the carriage slot in a lateral direction, e.g., clockwise or counterclockwise relative to an axis substantially parallel to the carriage slot. Similarly, the longitudinal bearings 216 may rotate within the carriage slot 200 in a longitudinal direction, e.g., clockwise or counterclockwise relative to a lateral axis orthogonal to the rotational axis of the lateral bearings 214. In embodiments, the lateral and longitudinal bearings 216 may include ball bearings, cylindrical roller bearings, and/or any other appropriate type of bearing compatible with the carriage slot 200.

In embodiments, the inclusion of lateral and longitudinal bearings 214, 216 rotating in orthogonal directions within the carriage slot 200 may further stabilize the wing armor 104 relative to the seat base 106, minimizing inflight vibration and/or play in lateral and longitudinal directions. In embodiments, the carriage 114 may be set into the carriage slot by any number of lateral and longitudinal bearings 214, 216, e.g., depending on applicable size, weight, power and/or cost (SWaP-C) factors.

Figures 2A, 2B:
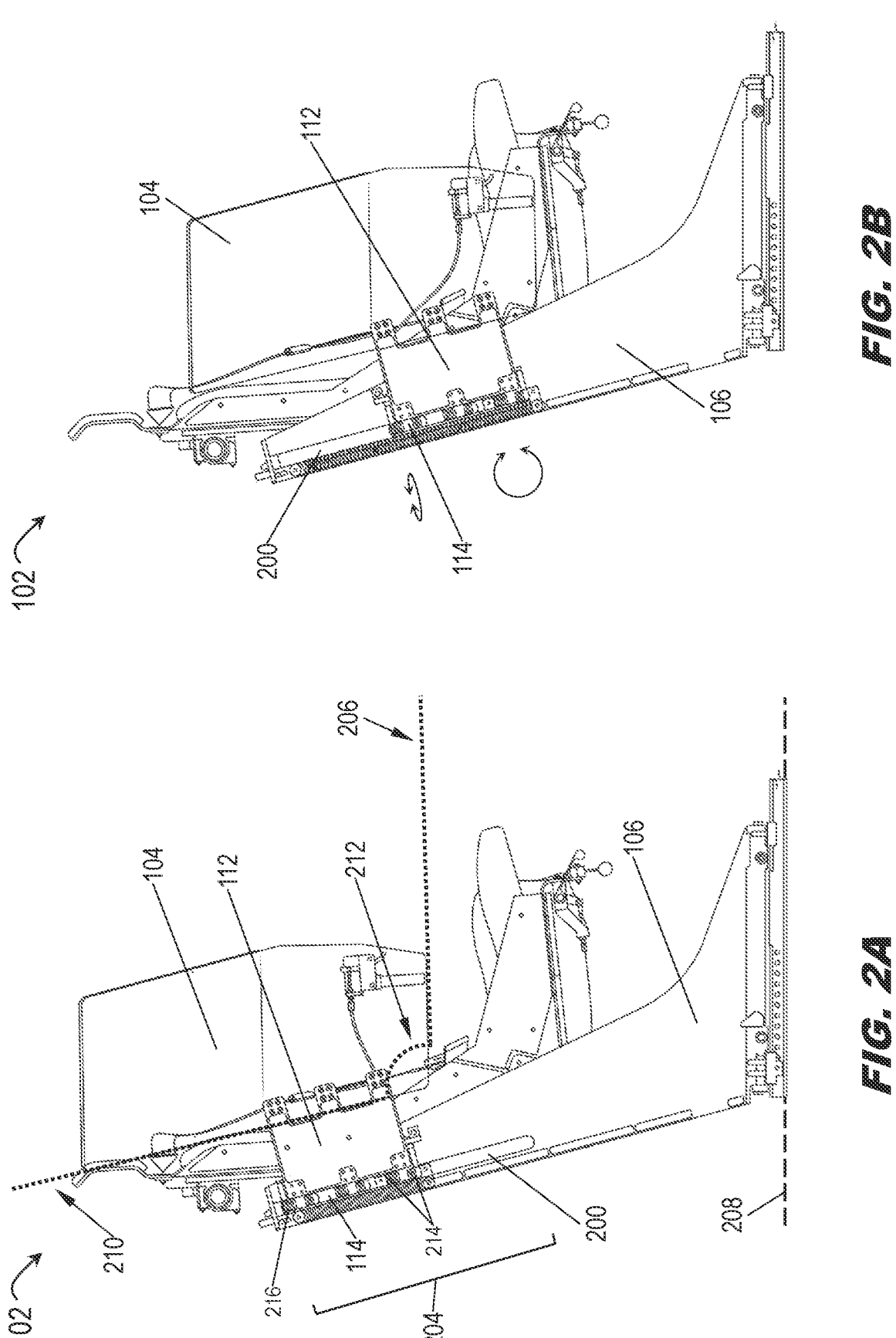
FIGS. 2A and 2B are right (e.g., outboard) profile views of the armored seating assembly of FIG. 1, with the wing armor shown respectively in full-up and full-down configurations.

In embodiments, the carriage 114 may translate along the carriage slot 200 between an upper and lower terminus of the slot. For example, when the carriage 114 reaches the upper terminus of the carriage slot 200, the wing armor 104 may be at a full-up or highest vertical position relative to the seat base 106, as shown by FIG. 2A. Similarly, when the carriage 114 reaches the lower terminus of the carriage slot 200, the wing armor 104 may be at a full-down or lowest vertical position relative to the seat base 106, as shown by FIG. 2B.

Figure 3B:
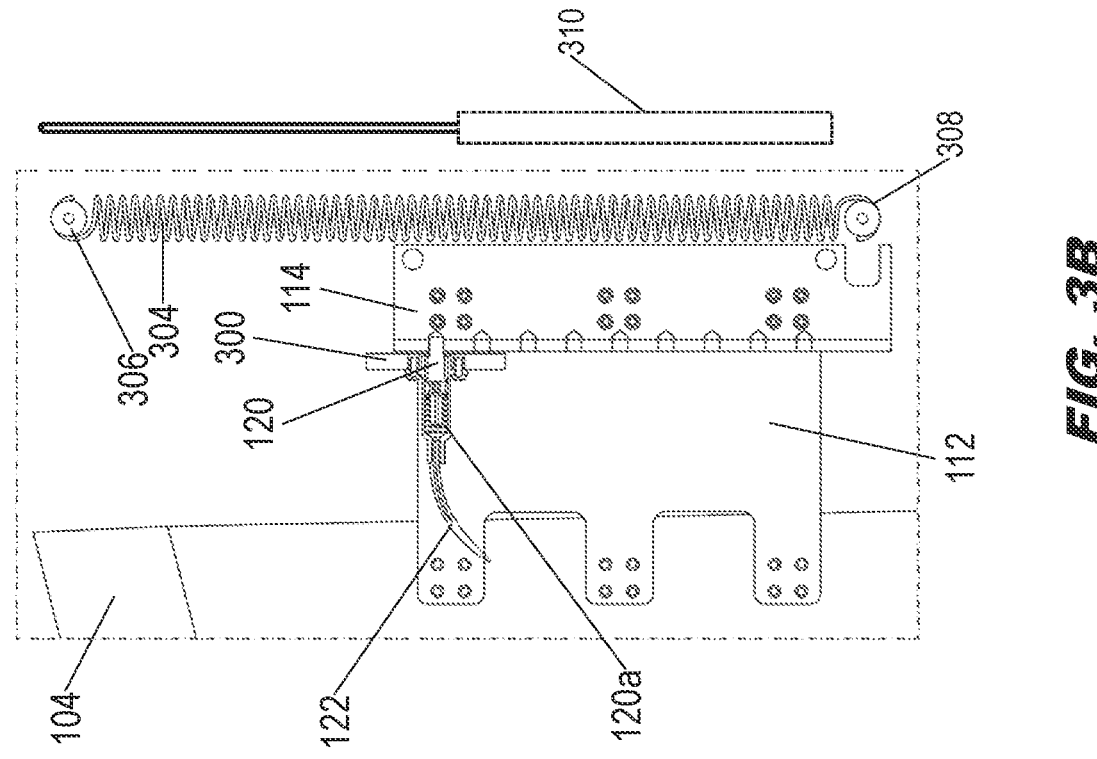
FIGS. 3A and 3B are inboard profile views of the locking mechanism and dampener system of the armored seating assembly of FIG. 1, the dampener system in default and extended states respectively.
Figure 3A:
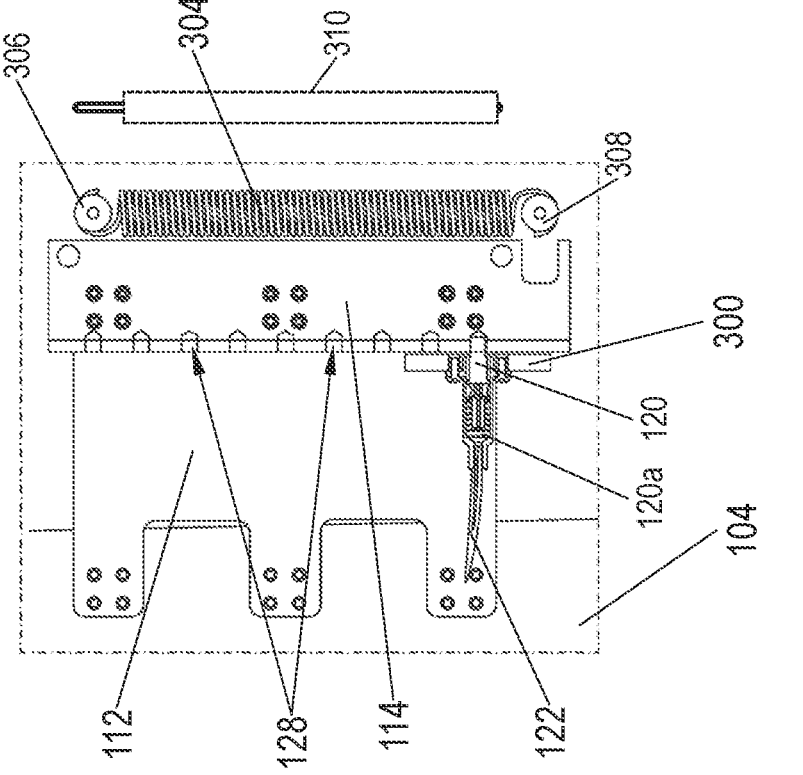

Referring now to FIGS. 3A and 3B, the wing armor 104, armor bracket 112, and carriage 114 are shown in respectively the full-up position also shown by, e.g., FIG. 2A and the full-down position also shown by, e.g., FIG. 2B.

In embodiments, the locking pin 120 may be fixed into a bracket 300 and the bracket likewise fixed to the seat base (106, FIG. 1). For example, the locking pin 120 may be spring-loaded (120a) to extend through the bracket 300 and into a metering hole 128 set into the forward face of the carriage 114. Further, as shown by FIG. 3A, and also by FIG. 2A, when the locking pin 120 extends through the lowermost metering hole 128 set into the carriage 114, the wing armor 104 may be in its uppermost full-up position relative to the seat base 106. Similarly, as shown by FIG. 3B, and also by FIG. 2B, when the locking pin 120 extends through the uppermost metering hole 128 set into the carriage 114, the wing armor 104 may be in its lowermost full-down position relative to the seat base 106.

Figure 2D:
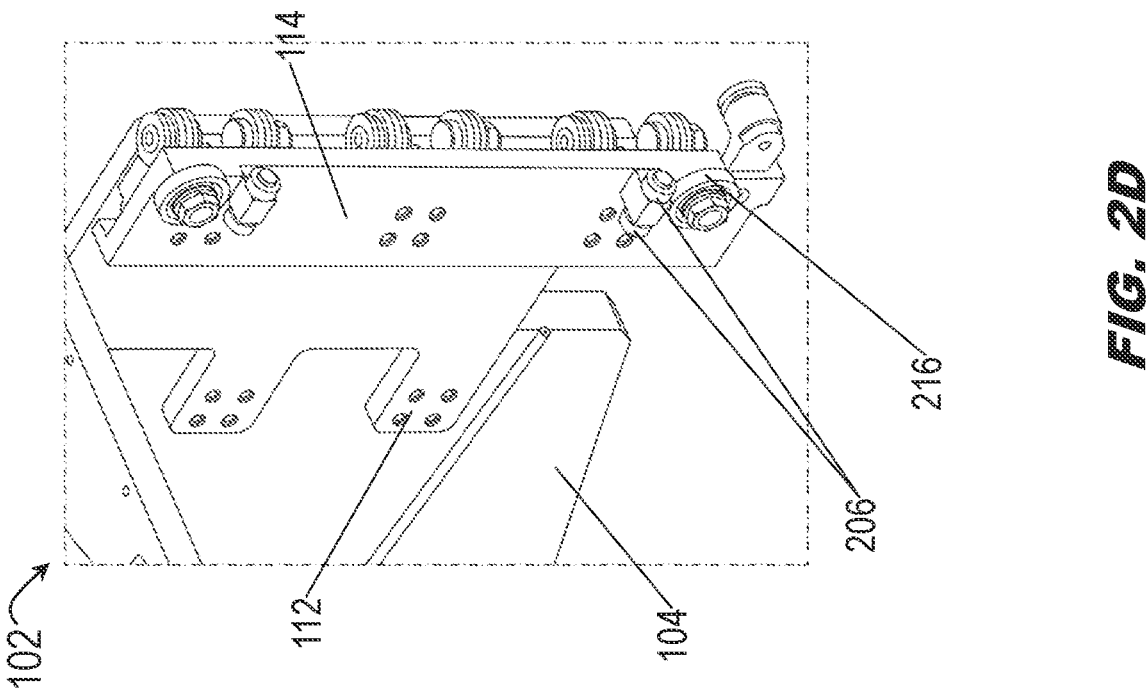
FIGS. 2C and 2D are respectively outboard and inboard isometric views of the armor bracket and carriage of the armored seating assembly of FIG. 1.
Figure 2C:
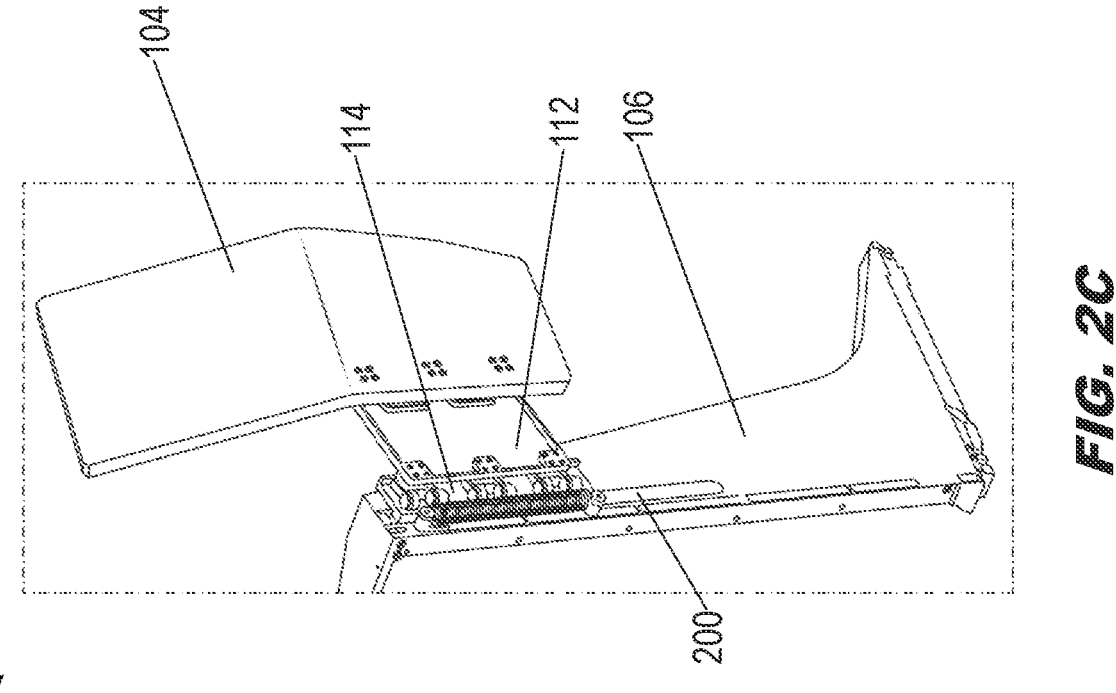
Figure 2F:
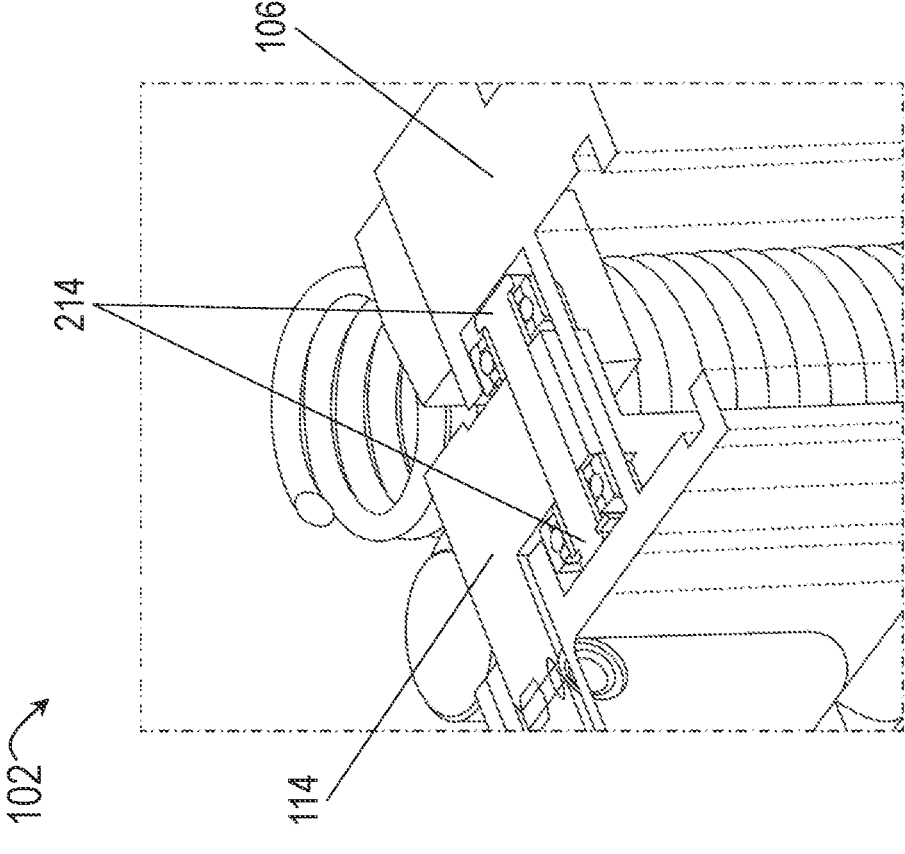
FIGS. 2E and 2F are overhead isometric views of the carriage slot, seat base, and carriage bearings of the armored seating assembly of FIG. 1.
Figure 2E:
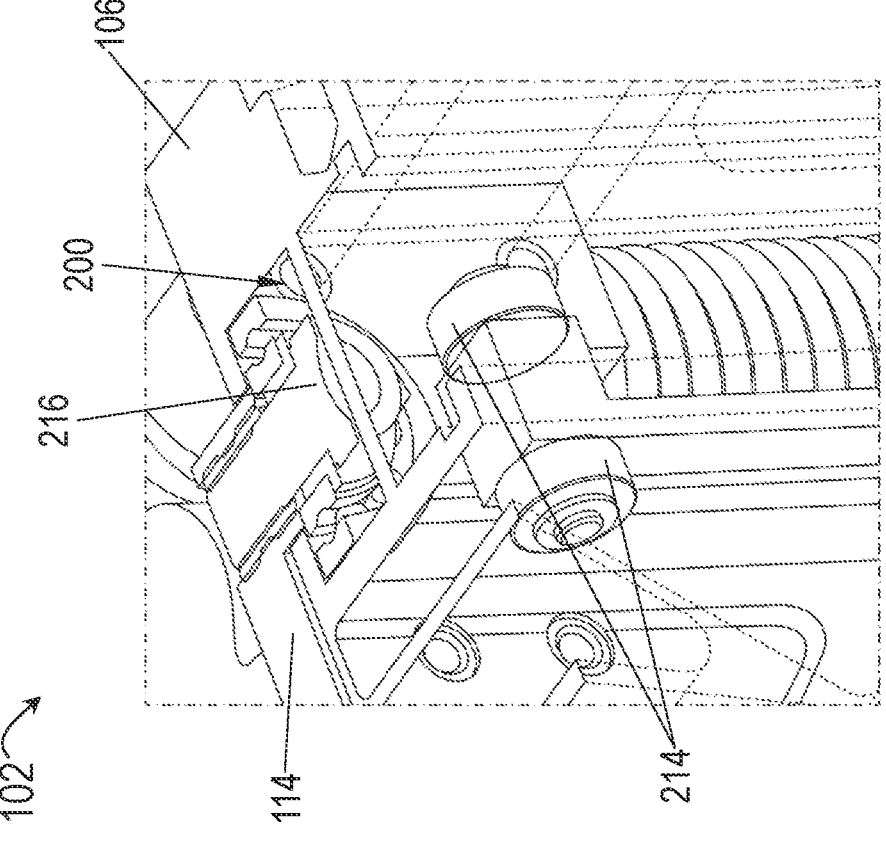
Figure 3C:
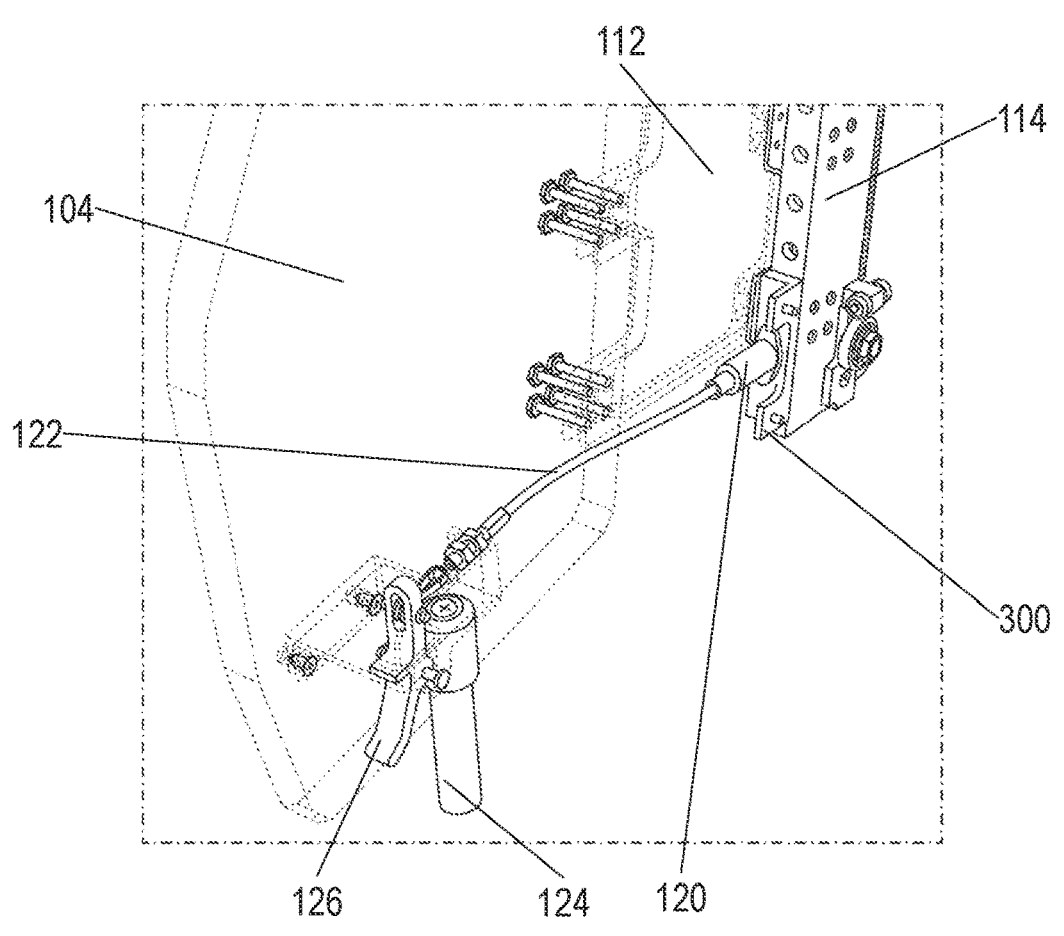
FIGS. 3C and 3D are inboard overhead isometric views of the frictional hinges and armor bracket of the armored seating assembly of FIG. 1.
Figure 3D:
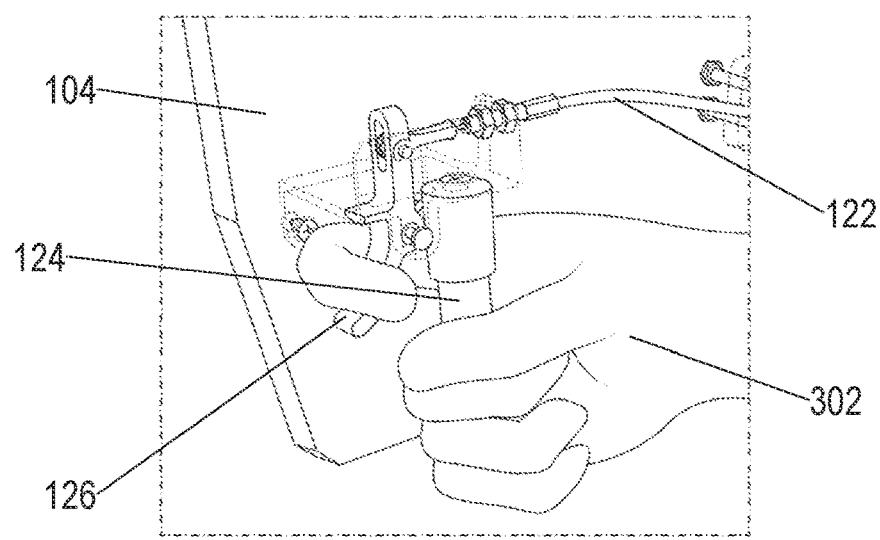

In embodiments, referring also to FIGS. 3C and 3D, when the pilot 302 occupying the pilot seat (102, FIG. 1) grasps the control handle (124, FIG. 1) and engages the lever (126, FIG. 1), the resulting tension on the cable 122 may contract the springs (120a; FIGS. 3A/B) and release the locking pin 120 from its metering hole 128, allowing the carriage 114, armor bracket 112, and wing armor 104 to move freely relative to the seat base 106 (and, e.g., allowing the lateral and longitudinal bearings (214, 216; FIG. 2D) to translate freely (118) along the carriage slot (200, FIGS. 2A-B). For example, the pilot 302 may vertically reposition the wing armor 104 by maintaining their grasp on the control handle 124 and lever 126, allowing the carriage 114 to translate up or down (118) along the carriage slot 200 until the locking pin 120 is aligned with the desired metering hole 128. By releasing the lever 126, the locking pin 120 may likewise be released to engage with the new metering hole 128 and the wing armor 104 may be secured to the new/desired discrete vertical position.

In embodiments, the armored seating assembly may include a dampening system attached to the carriage 114 and seat base 106. For example, the dampening system may provide resistance to gravity, reducing the speed at which the wing armor 104, armor bracket 112, and carriage 114 freely translate downward (118). Similarly, the dampening system may provide support to the pilot 302 when raising the wing armor 104 to a higher vertical position relative to the seat base 106.

In embodiments, the dampening system may include a dampening spring 304. For example, the dampening spring 304 may be attached to the seat base 106 by an upper mount 306 and attached to the carriage 114 by a lower mount 308. The dampening spring 304 may be in a fully compressed state when the wing armor 104 is in a full-up position, as shown by FIG. 3A. Similarly, the dampening spring 304 may be in a fully extended state when the wing armor 104 is in a full-down position, as shown by FIG. 3B, and may assist the pilot in raising the wing armor to a higher vertical position when the locking pin 120 is disengaged from the metering holes 128. In some embodiments, the dampening system may include a gas piston 310 or appropriate like linear actuator similarly providing resistance against downward tracking (118) of the wing armor 104 and assisting upward tracking (118) of the wing armor.

In some embodiments, the pilot seat (102, FIG. 1) may alternatively incorporate a frictional locking mechanism for securing the wing armor 104 to any of a continuum of vertical positions relative to the seat base 106 (as opposed to, for example, the set of discrete vertical positions achievable by securing the locking pin 120 into one of the set of metering holes 128, as disclosed above). For example, the wing armor 104 may include a vertically oriented frictional locking system similar to the frictional hinges disclosed below with respect to FIGS. 4A and 4B. Alternatively, in some embodiments the vertical position of the wing armor 104 may be incrementally adjusted via rotational adjustment of a nut in a threaded shaft translated to incremental vertical tracking (118) of the wing armor upward or downward relative to the seat base 106.

Figure 4B:
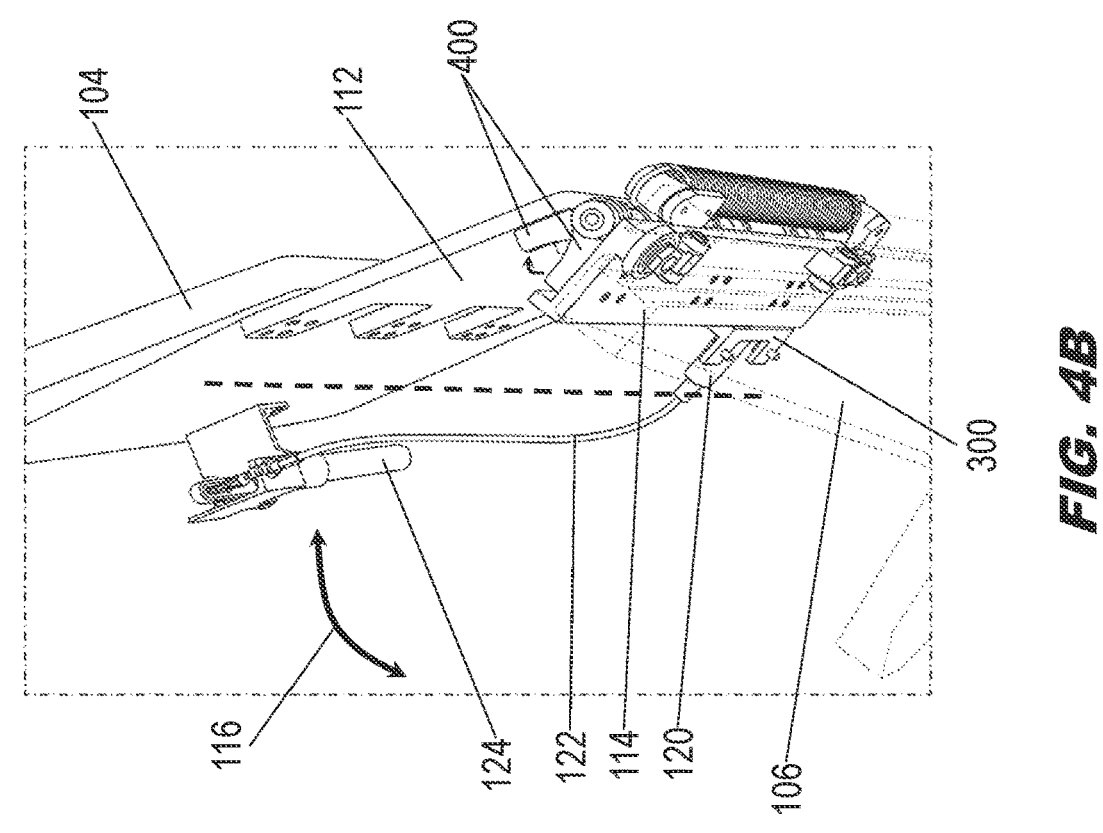
FIGS. 4A and 4B are inboard overhead isometric views of the control handle and lever of the armored seating assembly of FIG. 1.
Figure 4A:
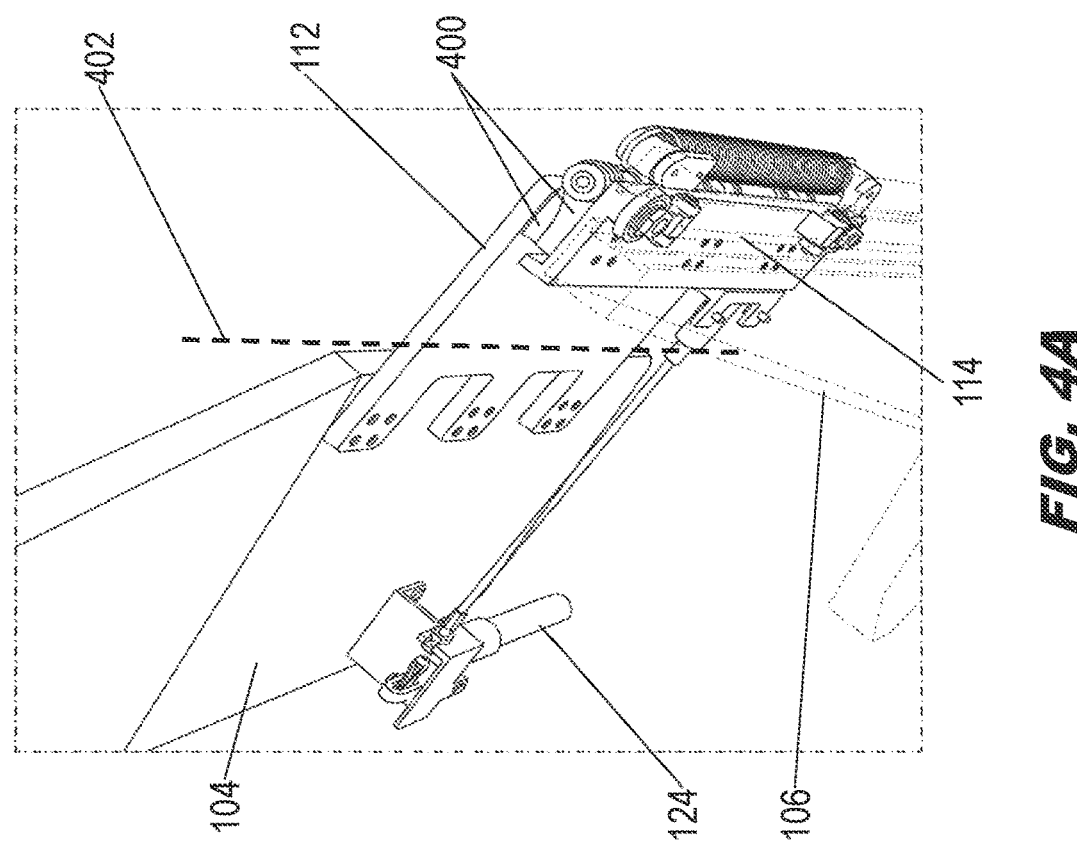

Referring now to FIGS. 4A and 4B, the wing armor 104 is shown in respectively a closed and open position with respect to the seat base 106.

In embodiments, referring in particular to FIG. 4A, the armor bracket 112 may be attached to the carriage 114 via one or more frictional hinges 400. For example, the frictional hinges 400 may allow the armor bracket 112 and wing armor 104 to be pivoted or rotated (116; e.g., by the pilot (302, FIG. 3D) occupying the pilot seat (102, FIG. 1), via the control handle 124) relative to a substantially vertical axis 402. The "closed" position of the wing armor 104 may be consistent with an orientation of the wing armor substantially orthogonal to the pilot seat 102 (and as also shown by, e.g., FIGS. 1 through 2C) and providing maximum coverage and protection to the pilot 302 occupying the seat. In embodiments, referring also to FIG. 4B, the pilot 302 may pivot or rotate (116) the wing armor 104 away from the pilot seat 102, e.g., in an outboard direction, to an "open" position facilitating entry to and egress from the pilot seat. In embodiments, the frictional hinges 400 maintain the armor bracket 112 and wing armor 104 stable in the rotational orientation to which they have been pivoted 116 by the pilot 302, preventing the wing armor 104 from pivoting freely between closed and open positions. For example, the armor bracket 112 may be attached to the carriage 114 via two, three, or any other number of frictional hinges 400 as appropriate.

In some embodiments, the pilot seat (102, FIG. 1) may incorporate metering holes as an alternative to the frictional hinges 400, allowing the wing armor 104 to be pivoted 116 and locked into a series of discrete rotational orientations, similarly to the metering holes (128, FIG. 1) set into the carriage 114. For example, the control handle 124 and lever 126 may be connected to a second cable, locking pin, and bracket (as opposed to the cable 122, locking pin 120, and bracket 300), the second locking pin and bracket securing the wing armor 104 and armor bracket 112 at a fixed rotational orientation relative to the carriage 114 and seat base 106. Similarly to the locking pin 120, the second locking pin may be spring-loaded to extend into a metering hole of the frictional hinges 400, securing the wing armor 104 at a desired rotational orientation relative to the seat base 106 until the second locking pin is released via engagement by the pilot 302 with the lever 126. In some embodiments, the locking pin 120 and second locking pin may be simultaneously released from their respective metering holes 128 by engagement with the lever 126. Further, once the second locking pin is released, the wing armor 104 may be pivoted or rotated to a new rotational orientation as desired by the pilot 302.

Embodiments of the inventive concepts disclosed herein may provide a more robust armored seating assembly less vulnerable to play and vibration associated with operational maneuvers of the aircraft, and more durable overall. Further, the frictional hinge attachment of the wing armor to the carriage allows for precise rotation of the wing armor to an orientation at which the armor will remain. Finally, the wing armor is more easily positionable and lockable by the pilot to a variety of vertical positions relative to the pilot seat proper.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. An armored seating assembly for an aircraft, comprising:

a seat base mountable to a floor of the aircraft, the seat base including a carriage slot with a lower and upper terminus, the carriage slot set into the seat base and extending vertically between the lower and upper terminus above the floor;

a carriage slidably coupled to the seat base via a plurality of bearings configured to translate along the carriage slot, the plurality of bearings including:

at least one lateral bearing configured for rotation relative to a lateral axis;

and at least one longitudinal bearing configured for rotation relative to a longitudinal axis orthogonal to the lateral axis;

an armor bracket pivotably coupled to the carriage; and an armor panel fixed to the armor bracket, the armor panel positionable to:

a vertical position corresponding to a position of the carriage relative to the carriage slot; and a rotational orientation relative to the seat base.

2. The armored seating assembly of claim 1, wherein: the armor bracket is pivotably coupled to the carriage by a plurality of frictional hinges configured for maintaining the armor panel at the rotational orientation to which it has been positioned.

3. The armored seating assembly of claim 1, further comprising:

at least one dampener device coupled to the seat base via an upper mount and to the carriage via a lower mount;

wherein the at least one dampener device has a default configuration associated with an uppermost vertical position of the armor panel and at least one extended configuration associated with a lowered vertical position of the armor panel.

4. The armored seating assembly of claim 3, wherein the at least one dampener device includes a spring.

5. The armored seating assembly of claim 3, wherein the at least one dampener device includes a piston.

6. The armored seating assembly of claim 1, further comprising:

a locking mechanism configured for securing the armor panel at a vertical position.

7. The armored seating assembly of claim 6, wherein: the carriage includes a vertical array of metering holes in a spaced apart relationship, each metering hole corresponding to a discrete vertical position of the armor panel; and wherein the locking mechanism comprises:

a locking pin fixed to the seat base, the locking pin configured to releasably extend into any one of the metering holes of the vertical array;

a handle fixed to the armor panel and graspable by an occupant of the seating assembly, the handle including a trigger operatively coupled to the locking pin via a cable, the trigger configured for releasing the locking pin from extending into any one of the metering holes.

\* \* \* \* \*